(12) United States Patent
Yosui et al.

(10) Patent No.: US 9,607,260 B2
(45) Date of Patent: Mar. 28, 2017

(54) ANTENNA DEVICE AND COMMUNICATION APPARATUS

(71) Applicant: Murata Manufacturing Co., Ltd., Nagaokakyo-shi, Kyoto-fu (JP)

(72) Inventors: Kuniaki Yosui, Nagaokakyo (JP); Takahiro Baba, Nagaokakyo (JP); Yuki Wakabayashi, Nagaokakyo (JP); Naoki Gouchi, Nagaokakyo (JP); Nobuo Ikemoto, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 14/250,547

(22) Filed: Apr. 11, 2014

(65) Prior Publication Data

US 2014/0217183 A1 Aug. 7, 2014

Related U.S. Application Data

(63) Continuation of application No. PCT/JP2012/077418, filed on Oct. 24, 2012.

(30) Foreign Application Priority Data

Nov. 8, 2011 (JP) .................. 2011-244251

(51) Int. Cl.
*G06K 19/00* (2006.01)
*G06K 19/077* (2006.01)
(Continued)

(52) U.S. Cl.
CPC ... *G06K 19/07783* (2013.01); *G06K 7/10178* (2013.01); *H01Q 1/2225* (2013.01); *H01Q 7/00* (2013.01); *H01F 38/14* (2013.01)

(58) Field of Classification Search
USPC .......................... 235/487, 492, 494
See application file for complete search history.

(56) References Cited

U.S. PATENT DOCUMENTS

2008/0170350 A1* 7/2008 Koumoto ................ B60L 5/005
361/230
2008/0315879 A1* 12/2008 Saha ...................... A61B 5/055
324/318

(Continued)

FOREIGN PATENT DOCUMENTS

CN 101356687 A 1/2009
CN 201781051 U 3/2011

(Continued)

OTHER PUBLICATIONS

Official Communication issued in corresponding Chinese Patent Application No. 201280045908.3, mailed on Dec. 26, 2014.

(Continued)

*Primary Examiner* — Matthew Mikels
(74) *Attorney, Agent, or Firm* — Keating & Bennett, LLP

(57) ABSTRACT

An antenna device is configured as a jacket of a communication terminal, such as a mobile terminal, and a communication apparatus includes the antenna device attached to the communication terminal. The antenna device uses an HF-band high frequency signal as a carrier frequency, and is configured as a reader/writer antenna device for a near field communication system. The base body of the antenna device is a plate-shaped base member made of a resin. An antenna coil and a feeding coil are provided integrally with the plate-shaped base member. High-frequency signals are transmitted between the feeding coil and the antenna coil through magnetic coupling in a non-contact manner.

16 Claims, 14 Drawing Sheets

(51) Int. Cl.
*H01Q 7/00* (2006.01)
*G06K 7/10* (2006.01)
*H01Q 1/22* (2006.01)
*H01F 38/14* (2006.01)

(56) References Cited

U.S. PATENT DOCUMENTS

2009/0009415 A1* 1/2009 Tanska et al. ............... 343/742
2009/0315680 A1 12/2009 Arimura
2012/0190310 A1 7/2012 Ieki et al.
2013/0050035 A1 2/2013 Kato et al.

FOREIGN PATENT DOCUMENTS

| JP | 2005-318329 A | 11/2005 |
| JP | 2006-048580 A | 2/2006 |
| JP | 2008-211572 A | 9/2008 |
| JP | 2010-266227 A | 11/2010 |
| WO | 2008/062828 A1 | 5/2008 |
| WO | 2011/052310 A1 | 5/2011 |
| WO | 2011/135934 A1 | 11/2011 |

OTHER PUBLICATIONS

Official Communication issued in International Patent Application No. PCT/JP2012/077418, mailed on Jan. 29, 2013.

* cited by examiner

FIG. 4
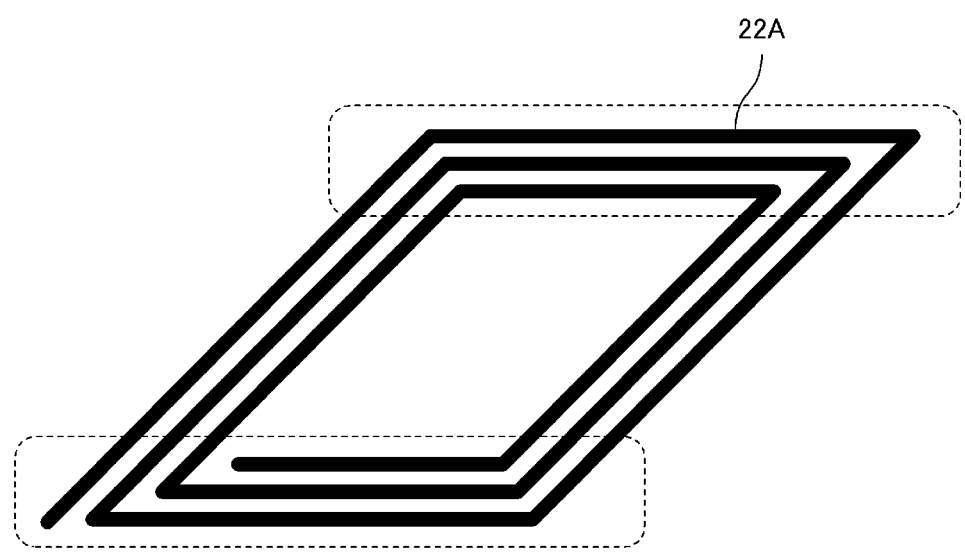
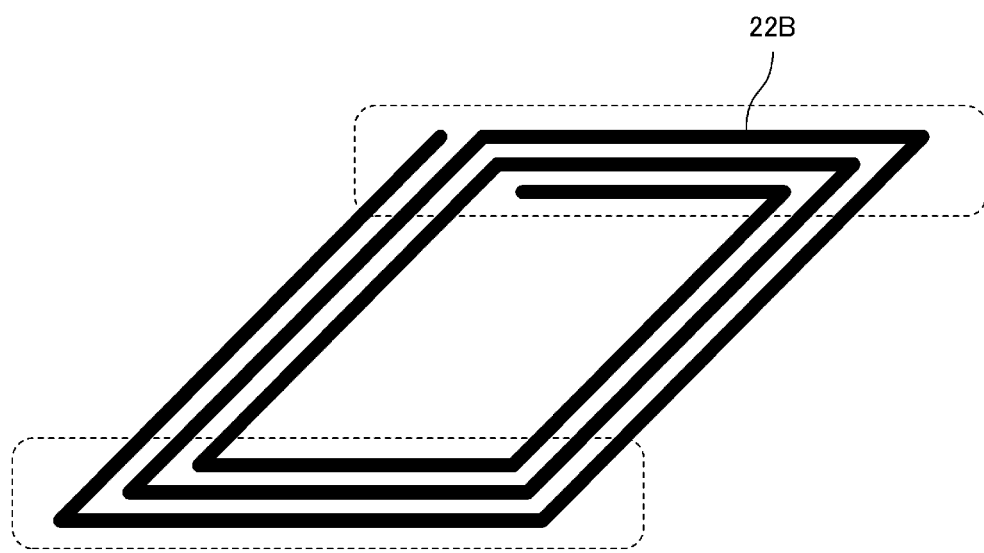

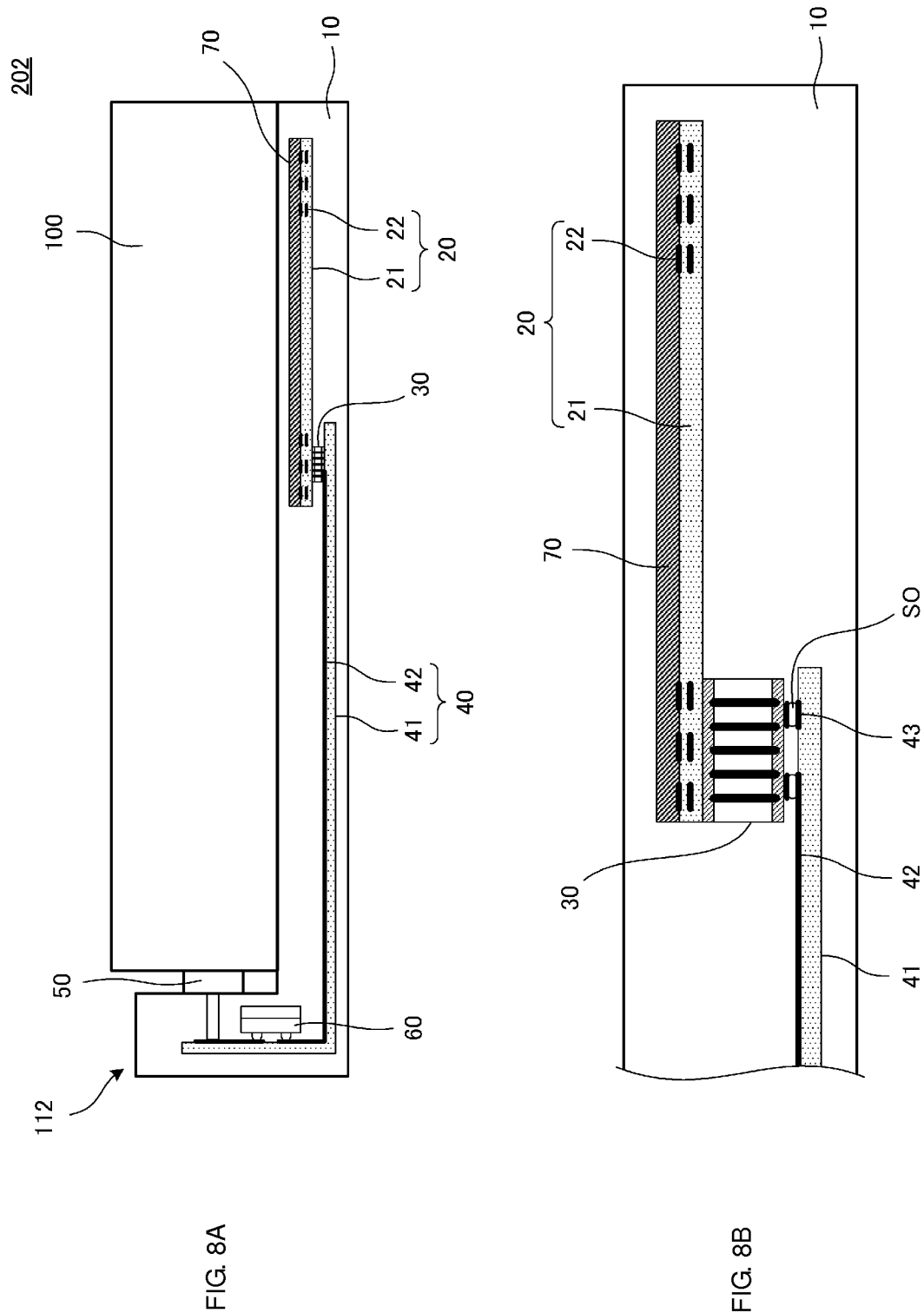

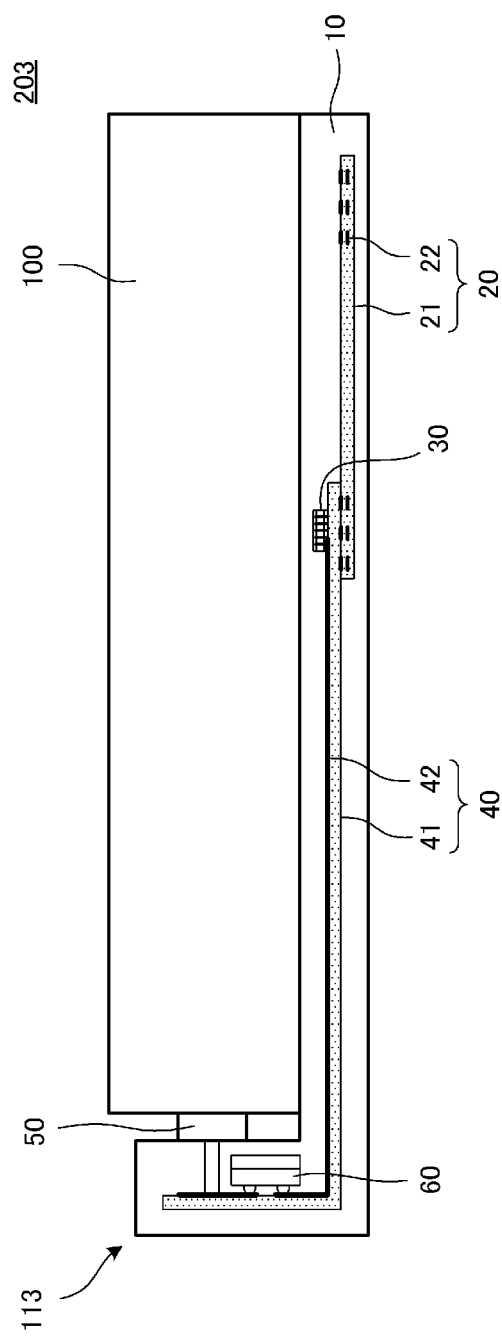
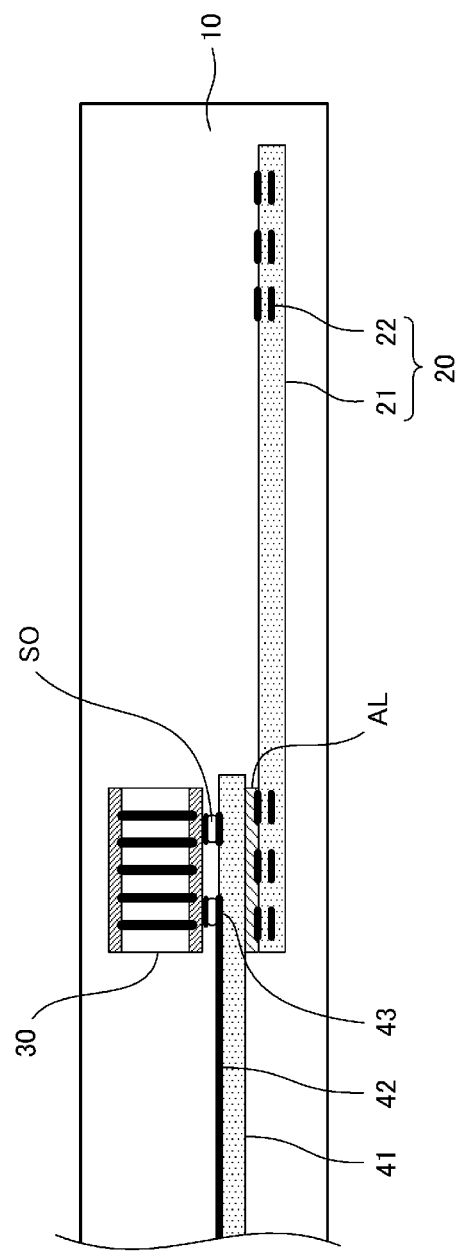
FIG. 9A
FIG. 9B

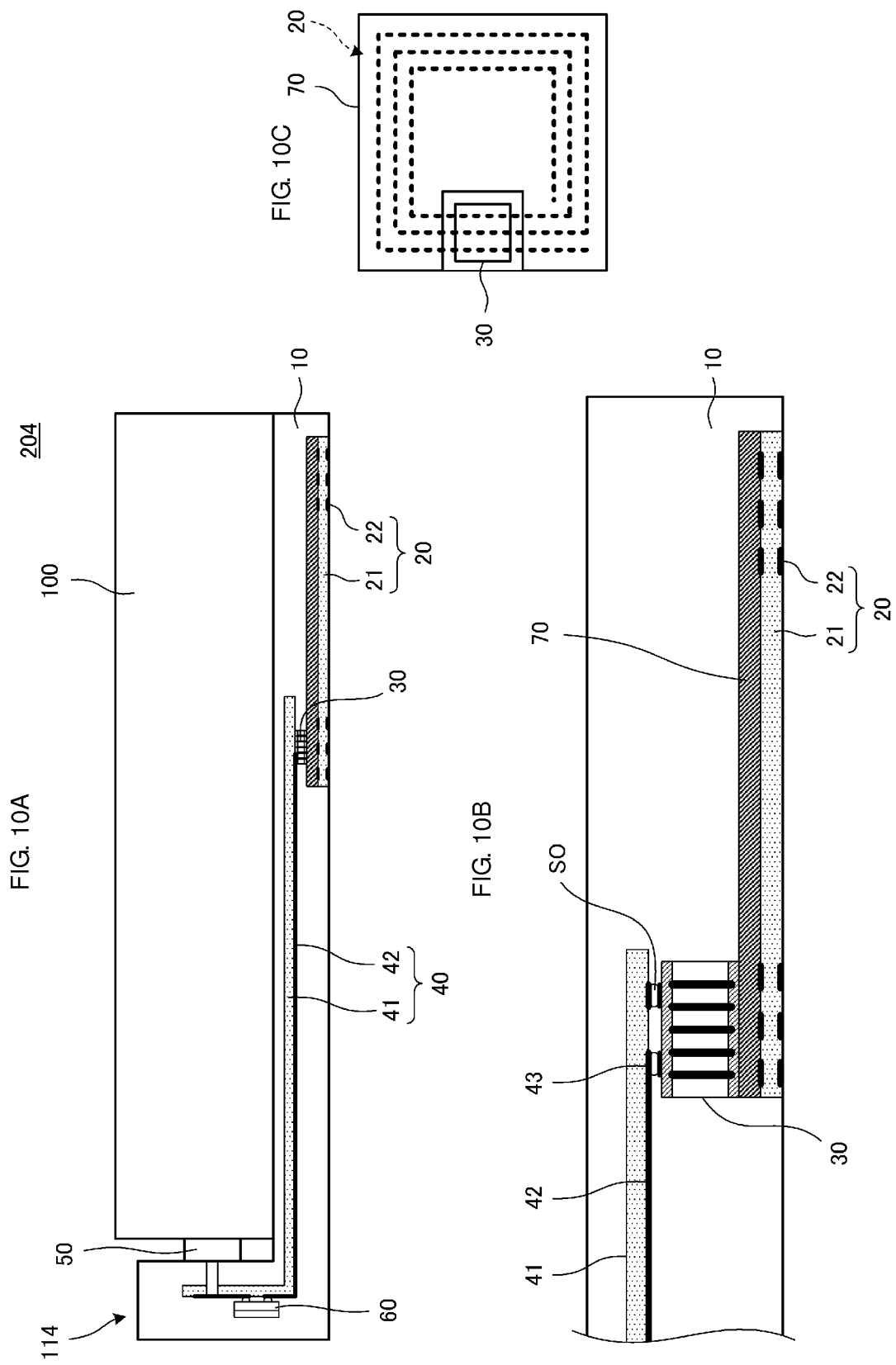

ANTENNA DEVICE AND COMMUNICATION APPARATUS

BACKGROUND OF THE INVENTION

1. Field of the Invention

The present invention relates to an antenna device included in an RFID system or the like and a communication apparatus including the antenna device.

2. Description of the Related Art

In recent years, communication terminals, such as cellular phones, which incorporate HF-band RFID systems and which themselves can be used as reader/writer devices or RFID tags have come into widespread use. However, with the reduction in size and increase in functionality of communication terminals, there may be a case in which it is difficult to provide a sufficient space for an antenna in the housing of a communication terminal.

Accordingly, Japanese Unexamined Patent Application Publication No. 2005-318329, for example, describes a known jacket-shaped device that can be detachably attached to a communication terminal. The jacket-shaped device includes an antenna coil, and an end portion of the antenna coil extends to a surface terminal. When the jacket-shaped device is attached to the communication terminal, the surface terminal is connected to a feeding circuit provided on the communication terminal through a connector or a spring contact.

The jacket-shaped device described in Japanese Unexamined Patent Application Publication No. 2005-318329 is formed of a thin plate-shaped resin member so that it can be attached to the communication terminal as inconspicuously as possible. Therefore, when the jacket receives an impact or is strongly grabbed, there is a risk that the jacket itself will be bent and a connecting portion between an antenna coil and a wiring conductor will break. In addition, in the case where the antenna coil and the wiring conductor are integrated inside the jacket, there is also a risk that the connecting portion between the antenna coil and the wiring conductor will break during a resin injection molding process. Thus, it is difficult to reliably integrate the antenna and the wiring conductor inside a thin plate-shaped resin member.

SUMMARY OF THE INVENTION

Preferred embodiments of the present invention provide a reliable antenna device in which a power-supplying portion configured to supply electric power to an antenna coil does not easily break, and a communication apparatus including the antenna device.

An antenna device according to a preferred embodiment of the present invention includes a plate-shaped base member that is attachable to a communication terminal or included in the communication terminal; an antenna coil provided with the plate-shaped base member; and a feeding coil that is magnetically coupled to the antenna coil, that is arranged with the plate-shaped base member together with the antenna coil, and that receives and outputs a feeding signal.

Preferably, the antenna coil includes a first base member and a coil conductor located on the first base member, and the antenna device further includes a wiring member including a second base member and a wiring conductor located on the second base member and connected to the feeding coil, and the feeding coil is a chip component, and is mounted on the second base member.

Preferably, the plate-shaped base member is attachable to the communication terminal and includes a connector to which the communication terminal is to be connected, and the feeding coil and the connector are connected to each other with the wiring conductor of the wiring member directly or via another circuit.

Preferably, an RFIC element is mounted on the second base member, the RFIC element being connected between the feeding coil and the connector and being configured as a chip component.

Preferably, the coil conductor of the antenna coil has a winding axis that extends in a direction perpendicular or substantially perpendicular to a principal surface of the plate-shaped base member, and the feeding coil is disposed near the coil conductor of the antenna coil such that a winding axis of the feeding coil is perpendicular or substantially perpendicular to the winding axis of the coil conductor of the antenna coil.

Preferably, the plate-shaped base member is attachable to the communication terminal, and a magnetic layer is provided between the communication terminal and the antenna coil.

Preferably, the plate-shaped base member is attachable to the communication terminal, and the feeding coil and the antenna coil are integrated in the plate-shaped base member so that the antenna coil and the feeding coil are arranged in that order when viewed from the communication terminal.

Preferably, the feeding coil, the antenna coil, and the wiring member are integrated together.

Preferably, the plate-shaped base member is attachable to the communication terminal, and the plate-shaped base member is a jacket having an external shape that extends at least along one principal surface of the communication terminal and one of side surfaces of the communication terminal.

A communication apparatus according to another preferred embodiment of the present invention includes an antenna device including an antenna coil provided with a plate-shaped base member and a feeding coil that is magnetically coupled to the antenna coil, that is arranged with the plate-shaped base member together with the antenna coil, and that receives and outputs a feeding signal; and a communication terminal attached to the plate-shaped base member.

According to various preferred embodiments of the present invention, even when the plate-shaped base member receives a stress and is bent or curved, a power-supplying portion configured to supply electric power to the antenna coil is prevented from breaking. In addition, the power-supplying portion configured to supply electric power to the antenna device is prevented from breaking also in the process of integrating the antenna device with the plate-shaped base member. As a result, the reliabilities of the antenna device that includes the plate-shaped base member as a body and the communication apparatus including the antenna device are significantly increased.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is an exploded perspective view showing patterns of coil conductors 22A and 22B included in the antenna coil 20.

FIG. 8A is a sectional view of a communication apparatus 202 in the state in which a communication terminal 100 is attached to a jacket 10 of an antenna device 112 according to a second preferred embodiment of the present invention. FIG. 8B is an enlarged partial sectional view of a coupling portion in which a feeding coil 30 is coupled to an antenna coil 20.

FIG. 9A is a sectional view of a communication apparatus 203 in the state in which a communication terminal 100 is attached to a jacket 10 of an antenna device 113 according to a third preferred embodiment of the present invention. FIG. 9B is an enlarged partial sectional view of a coupling portion in which a feeding coil 30 is coupled to an antenna coil 20.

FIG. 10A is a sectional view of a communication apparatus 204 in the state in which a communication terminal 100 is attached to a jacket 10 of an antenna device 114 according to a fourth preferred embodiment of the present invention. FIG. 10B is an enlarged partial sectional view of a coupling portion in which a feeding coil 30 is coupled to an antenna coil 20. FIG. 10C is a plan view illustrating the positional relationship between the feeding coil 30, a magnetic layer 70, and the antenna coil 20, and the shapes thereof.

DETAILED DESCRIPTION OF THE PREFERRED EMBODIMENTS

First Preferred Embodiment

Figure 1A:
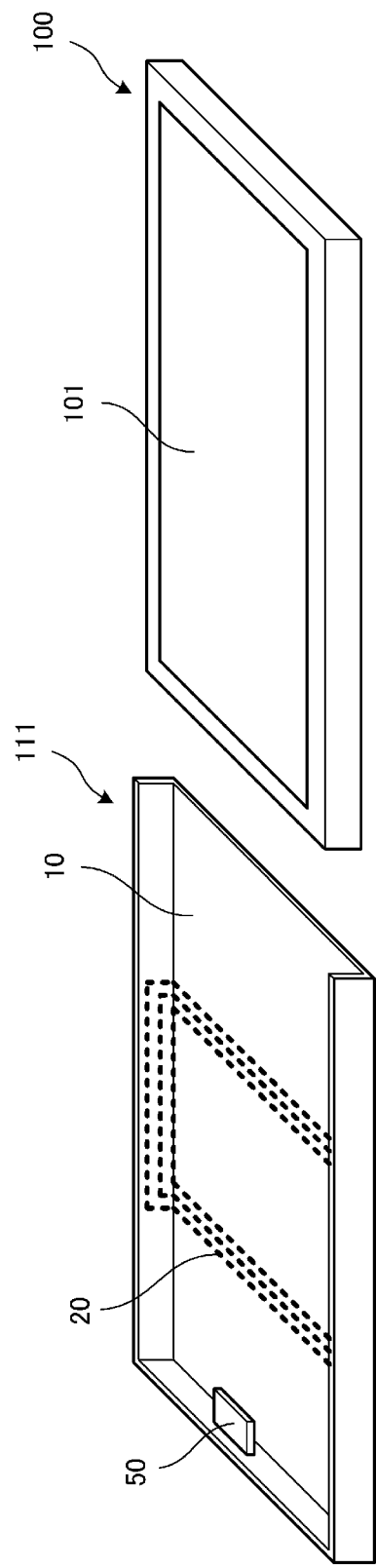
FIG. 1A is a perspective view of an antenna device 111 and a communication terminal 100 according to a first preferred embodiment of the present invention.
Figure 1B:
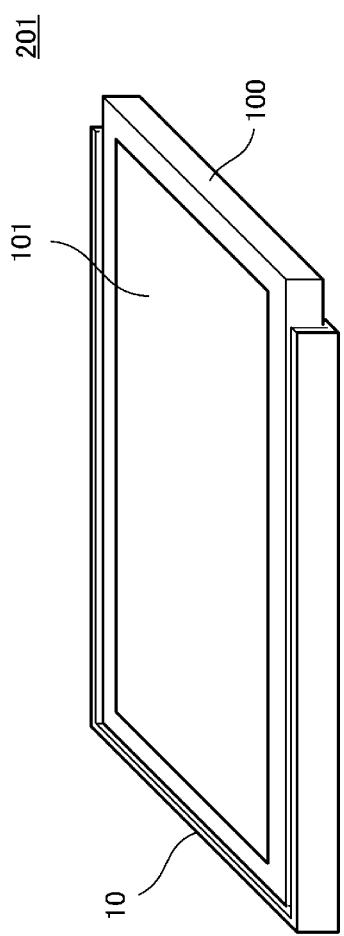
FIG. 1B is a perspective view of a communication apparatus 201.

FIG. 1A is a perspective view of an antenna device 111 and a communication terminal 100 according to a first preferred embodiment of the present invention, and FIG. 1B is a perspective view of a communication apparatus 201. The appearance of the antenna device 111 is that of a jacket of the communication terminal 100. The communication terminal 100 is, for example, a mobile terminal, and is attached to the antenna device 111 in such a manner that a front surface (operation/display surface) thereof is viewable.

The communication apparatus 201 is preferably formed by attaching the antenna device 111 to the communication terminal 100, or attaching the communication terminal 100 to the antenna device 111, for example.

The antenna device 111 preferably is an antenna device that uses an HF-band high frequency signal as a carrier frequency, and is configured as a reader/writer antenna device for a near field communication (NFC) system.

The antenna device 111 preferably is a jacket-shaped functional device that is externally attached to the communication terminal 100. The base body of the antenna device 111 preferably is a thin plate-shaped base member (plate-shaped base member) made of a resin. An antenna coil 20 and a feeding coil 30 preferably are formed integrally with the thin plate-shaped base member (plate-shaped base member). The antenna coil 20 has a winding axis that extends in the direction of the normal of a principal surface (a direction perpendicular or substantially perpendicular to the principal surface) of the thin plate-shaped base member (plate-shaped base member). In this example, the antenna coil 20 includes a coil conductor that extends along both the principal surface and side surfaces of the thin plate-shaped base member (plate-shaped base member).

The feeding coil 30 is coupled to the antenna coil 20 via a magnetic field. In other words, a high-frequency signal is transmitted from the feeding coil 30 to the antenna coil 20 (or from the antenna coil 20 to the feeding coil 30) through magnetic coupling in a non-contact manner. The antenna coil 20 is sufficiently larger than the feeding coil 30, and communication with an antenna of a communication partner is performed mainly by the antenna coil 20.

The antenna device 111 includes a connector 50, and the connector (plug) 50 is connected to a connector (receptacle) provided on the communication terminal 100.

Figure 2A:
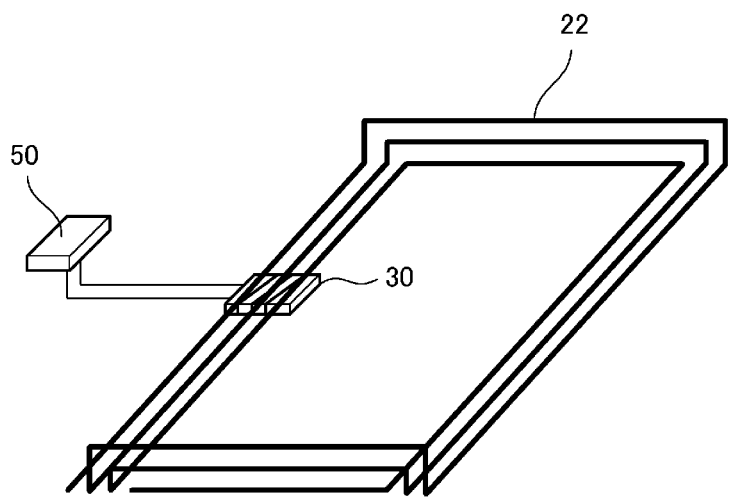
FIGS. 2A and 2B are diagrams illustrating the relationships between the orientations and positions of an antenna coil 20 and a feeding coil 30.
Figure 2B:
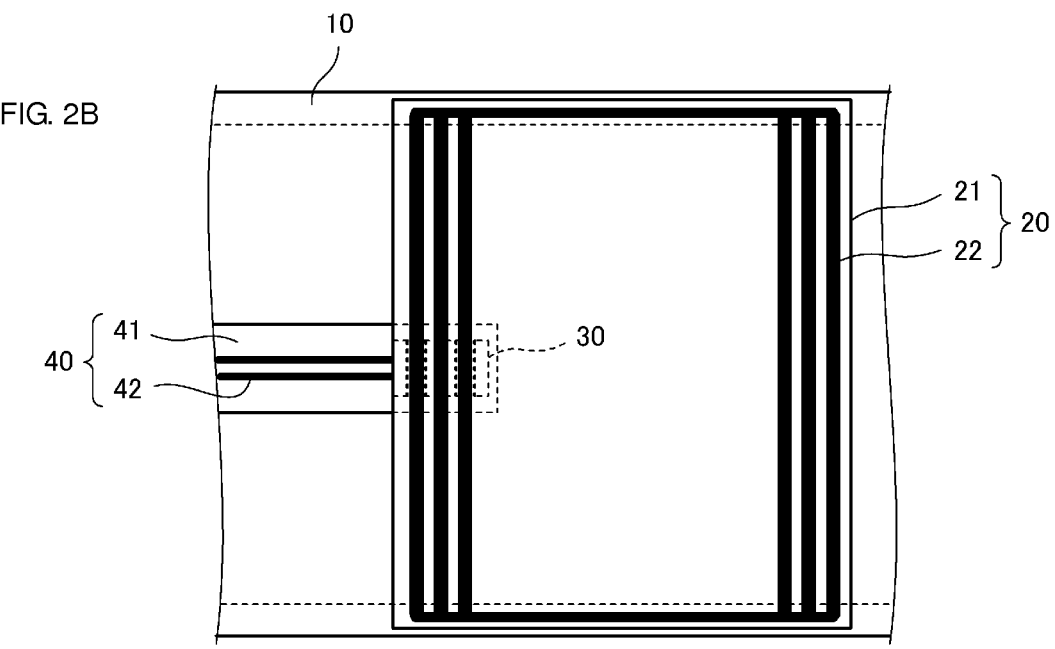

FIGS. 2A and 2B are diagrams illustrating the relationships between the orientations and positions of the antenna coil 20 and the feeding coil 30. In FIGS. 2A and 2B, an RW unit 60, which will be described below, is omitted. The antenna coil 20 includes a flexible base member 21, which is a first base member, and a coil conductor 22 preferably configured in a rectangular or substantially rectangular spiral pattern on the flexible base member 21. The feeding coil 30 is arranged near the coil conductor 22 of the antenna coil such that a winding axis of a coil conductor of the feeding coil 30 is perpendicular or substantially perpendicular to the winding axis of the coil conductor 22 of the antenna coil 20.

The coil conductor of the feeding coil 30 is connected to the connector 50 through a wiring member 40. The wiring member 40 includes a flexible base member 41, which is a second base member, and a wiring conductor 42 formed on the flexible base member 41. The feeding coil 30 is surface-mounted on the upper surface of the wiring member 40.

A loop of magnetic flux provided by the coil conductor of the feeding coil 30 is linked with a loop of the coil conductor 22 of the antenna coil 20. Similarly, a loop of magnetic flux provided by the coil conductor 22 of the antenna coil 20 is linked with a loop of the coil conductor of the feeding coil 30. In other words, the coil conductor 22 of the antenna coil 20 and the coil conductor of the feeding coil 30 are magnetically coupled.

Figure 3A:
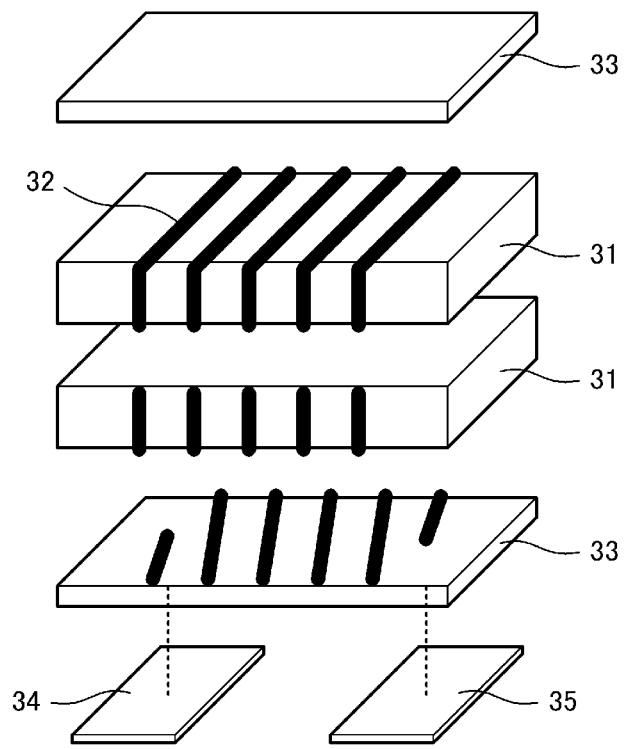
FIG. 3A is an exploded perspective view of the feeding coil 30.
Figure 3B:
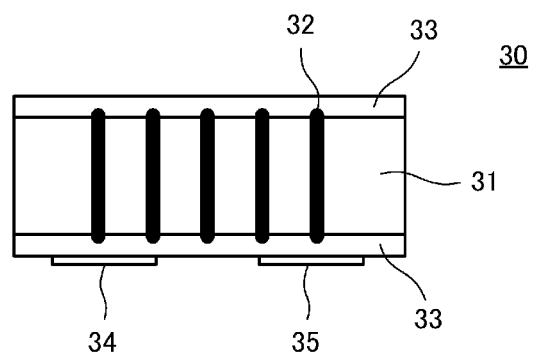
FIG. 3B is a front view of the feeding coil 30.

FIG. 3A is an exploded perspective view of the feeding coil 30, and FIG. 3B is a front view of the feeding coil 30. The feeding coil 30 is a multilayer body which includes magnetic layers 31 and nonmagnetic layers 33 and on which a coil conductor 32 is provided. The magnetic layers 31 preferably are composed of a magnetic ferrite, and the nonmagnetic layers 33 preferably are composed of a dielectric (nonmagnetic ferrite). FIGS. 3A and 3B illustrate a single feeding coil cut out from a mother substrate. In the state before the mother substrate is cut, portions of the coil conductor 32 that are provided on end surfaces of the magnetic layers 31 correspond to via holes filled with a conductor. Input/output terminals 34 and 35 that are electrically connected to the coil conductor 32 and the wiring conductor 42 of the wiring member 40 are provided on the bottom surface of the lower nonmagnetic layer 33.

FIG. 4 is an exploded perspective view showing patterns of coil conductors 22A and 22B included in the coil conductor 22 of the antenna coil 20. The coil conductor 22A is a coil conductor located on the upper surface of the flexible base member 21 illustrated in FIG. 2B, and the coil conductor 22B is a coil conductor located on the lower surface of the flexible base member 21. The coil conductors 22A and 22B oppose each other. Each of them coil conductors 22A, 22B preferably is rectangular or substantially rectangular spiral shaped, and the winding direction of the coil conductor 22A on the upper surface from the outer periphery to the inner periphery is the same as the winding direction of the coil conductor 22B on the lower surface from the inner periphery to the outer periphery. When the antenna coil 20 is formed integrally with the thin plate-shaped base member, portions shown by the broken lines in FIG. 4 are bent 90°.

Figure 5:
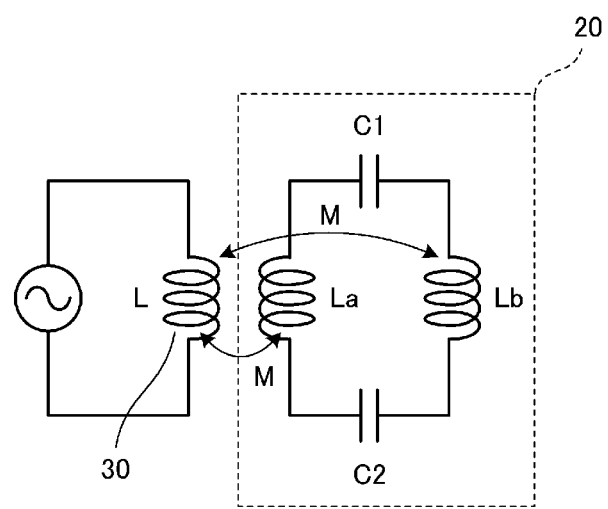
FIG. 5 is an equivalent circuit diagram of a circuit including the antenna coil 20 and the feeding coil 30 of the antenna device 111.

FIG. 5 is an equivalent circuit diagram of a circuit including the antenna coil 20 and the feeding coil 30 of the antenna device 111. Referring to FIG. 5, inductors La and Lb represent the inductances of the coil conductors 22A and 22B illustrated in FIG. 4, and capacitors C1 and C2 represent capacitances between the coil conductors 22A and 22B. The inductors La and Lb and the capacitors C1 and C2 define an LC resonant circuit. The couplings between the inductor L of the feeding coil 30 and the inductors La and Lb are indicated by M.

Figure 6:
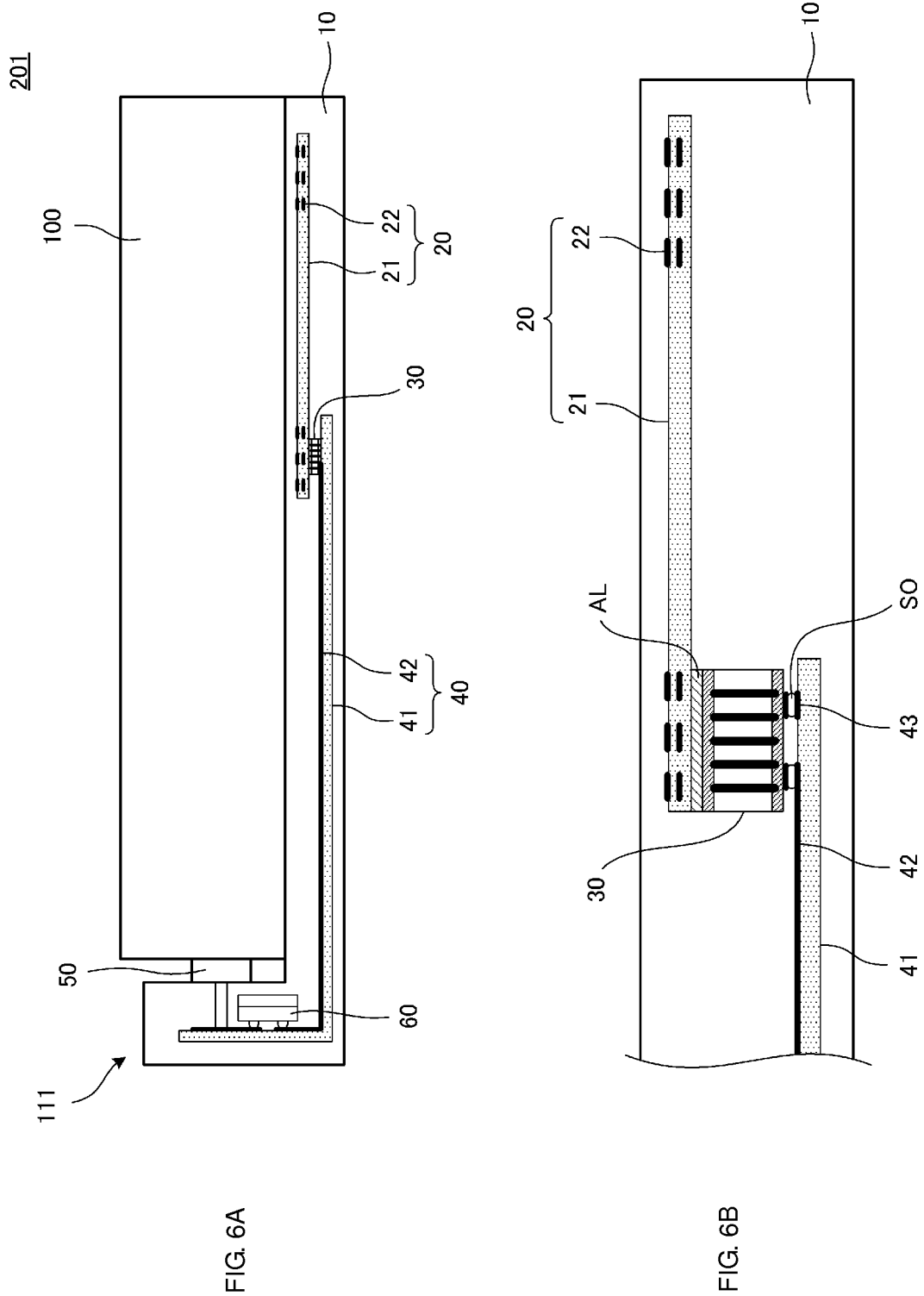
FIG. 6A is a sectional view of the communication apparatus 201 in the state in which the communication terminal 100 is attached to a jacket 10 of the antenna device 111.
FIG. 6B is an enlarged partial sectional view of a coupling portion in which the feeding coil 30 is coupled to the antenna coil 20.

FIG. 6A is a sectional view of the communication apparatus 201 in the state in which the communication terminal 100 is attached to a jacket 10 of the antenna device 111. FIG. 6B is an enlarged partial sectional view of a coupling portion in which the feeding coil 30 is coupled to the antenna coil 20. FIG. 6A does not show the internal structure of the communication terminal 100.

As illustrated in FIG. 6B, the feeding coil 30 is mounted on mounting lands 43, which are located on the flexible base member 41, with solder SO. Also, the feeding coil 30 is bonded to the flexible base member 21 of the antenna coil preferably with an adhesive AL, for example, at a position such that the coil conductor of the feeding coil 30 overlaps the coil conductor 22 of the antenna coil.

As illustrated in FIG. 6A, the read/write (RW) unit 60, which includes an RFIC element, is mounted on the wiring member 40 at a position between the connector 50 and the feeding coil 30. The RW unit 60 is provided on a side wall portion of the jacket-shaped device. Therefore, the RW unit 60 does not easily receive a stress even when the jacket-shaped device is bent or curved.

The coil conductor 22 of the antenna coil 20 preferably is formed on the flexible base member 21, and the feeding coil 30 is bonded to the flexible base member 21 in advance. Therefore, the positional relationship between the coil conductor 22 of the antenna coil and the feeding coil 30 does not change in the molding process for forming the jacket 10.

In the state illustrated in FIG. 6A, communication is achieved when the communication apparatus 201 is placed such that the antenna of the communication partner is below the bottom surface of the communication apparatus 201 (surface of the jacket 10 at the side opposite to the communication-terminal-100 side).

Figure 7:
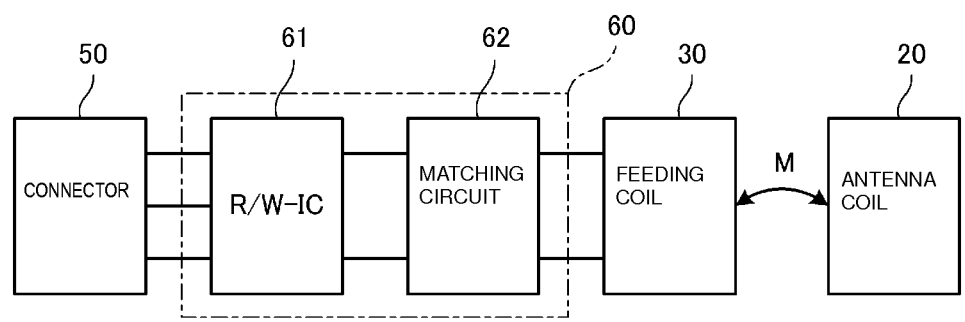
FIG. 7 is a block diagram illustrating the circuit configuration of the antenna device 111.

FIG. 7 is a block diagram illustrating the circuit configuration of the antenna device 111. The RW unit 60 connected between the connector 50 and the feeding coil 30 includes a read/write (R/W) IC 61, which is an RFIC element, and a matching circuit 62. The matching circuit 62 includes an inductor and a capacitor, and constitutes a LC resonant circuit. The matching circuit 62 performs impedance matching between the feeding coil 30 and a high-frequency input/output unit of the R/W IC 61. The capacitor may preferably include a variable capacitance element so that the resonant frequency of the feeding coil 30 is varied. As described above, the coil conductors of the feeding coil 30 and the antenna coil 20 are magnetically coupled.

With the antenna device 111 according to the present preferred embodiment, even when, for example, the communication terminal 100 is dropped and the jacket (plate-shaped base member) 10 receives an impact and is bent or curved, a power-supplying portion configured to supply electric power to the antenna coil 20 does not easily break because the power-supplying portion is not directly connected to the antenna coil 20 in a direct-current manner. Also, the power-supplying portion configured to supply electric power to the antenna coil 20 does not easily break in the process of forming the antenna coil 20 and the feeding coil 30 integrally with the jacket (plate-shaped base member) 10. Therefore, a reliable antenna device 111 and a reliable communication apparatus 201 is provided. In other words, in a jacket-shaped device attached to a communication terminal, such as a smart phone (cellular phone having a function of a personal mobile computer, or a personal digital assistance (PDA) having a function of a cellular phone and a telecommunication function), electric power is supplied to an antenna coil through magnetic coupling by using a feeding coil. Since no physical or electrical connecting portion is provided between the antenna coil 20 and the wiring member 40, the risk that the connecting portion will break during the molding process or while in use is reduced.

In the antenna device 111 according to the present preferred embodiment, the jacket-shaped device preferably defines and serves as the main portion of the NFC system. Therefore, it is not necessary to dispose the main portion of the NFC system on the communication terminal.

In addition, in the antenna device 111 according to the present preferred embodiment, the antenna coil 20 is configured so as to extend along both a principal surface and side surfaces of the jacket 10. When the antenna coil 20 is configured in this manner, communication is performed not only in a direction from one principal surface (back surface) of the communication terminal 100 but also in directions from the other principal surface (front surface) and side surfaces of the communication terminal 100.

In addition, in the antenna device 111 according to the present preferred embodiment, the feeding coil 30 is arranged near the coil conductor 22 of the antenna coil such that a winding axis of the coil conductor of the feeding coil 30 is perpendicular or substantially perpendicular to the winding axis of the coil conductor 22 of the antenna coil 20. Therefore, the degree of coupling between the feeding coil 30 and the antenna coil 20 is increased even when the size of the feeding coil 30 is reduced. In addition, with this arrangement, the degree of coupling between the antenna coil 20 and the feeding coil 30 is not easily affected by the ambient environment.

In addition, in the antenna device 111 according to the present preferred embodiment, the resonant frequency of the feeding coil 30 is determined by the inductance and capacitance components of the coil conductor 32 (and the capacitance of a capacitor that is externally connected to the feeding coil 30), and the resonant frequency of the antenna coil 20 is determined by the LC resonant circuit illustrated in FIG. 5. The communication distance to the antenna of the communication partner is increased by appropriately setting the resonant frequency of the feeding coil 30 and the resonant frequency of the antenna coil 20. More specifically, two resonant frequencies, which are odd-mode and even-mode frequencies, are generated by the magnetic coupling (inductive coupling) of the two resonant circuits. The difference between the two frequencies increases as the coupling coefficient increases, and wide-band characteristics are obtained.

For example, in the case where an HF band having a center frequency of 13.56 MHz is used as in an NFC system such as FeliCa (registered trademark), the center frequency of the pass band in the state in which the antenna coil 20 and the feeding coil 30 are coupled is set to 13.56 MHz.

As described above, the antenna device 111 according to the present preferred embodiment includes a coupled circuit in which two resonant circuits are coupled together. Therefore, variation in the pass band characteristics due to the presence/absence of a metal object near the antenna coil 20 and the distance between the metal object and the antenna coil 20 is small. As a result, the antenna gain is stable.

Second Preferred Embodiment

FIG. 8A is a sectional view of a communication apparatus 202 in the state in which a communication terminal 100 is attached to a jacket 10 of an antenna device 112 according to a second preferred embodiment of the present invention. FIG. 8B is an enlarged partial sectional view of a coupling portion in which a feeding coil 30 is coupled to an antenna coil 20. FIG. 8A does not show the internal structure of the communication terminal 100.

Unlike the antenna device according to the first preferred embodiment, in the second preferred embodiment, a magnetic layer 70 is disposed between the antenna coil 20 and the communication terminal 100. The magnetic layer 70 is preferably formed by applying a magnetic sheet to a back surface of the antenna coil 20 so as to cover the antenna coil 20.

According to the present preferred embodiment, a magnetic sheet is applied to the back surface of the antenna coil 20 so as to cover the antenna coil 20. Therefore, when the jacket 10 is attached to the communication terminal 100, the resonant frequency of the antenna coil 20 is prevented from being changed depending on the type of the communication terminal 100 (in particular, the material of the housing) or the manner in which the jacket 10 is attached to the communication terminal 100. In addition, even when the housing of the communication terminal 100 is made of metal or contains a metal member therein, since the magnetic flux passes through the magnetic layer 70, eddy current is hardly generated in the metal housing or the metal member contained therein, and the low-loss state is preferably maintained.

Third Preferred Embodiment

FIG. 9A is a sectional view of a communication apparatus 203 in the state in which a communication terminal 100 is attached to a jacket 10 of an antenna device 113 according to a third preferred embodiment of the present invention. FIG. 9B is an enlarged partial sectional view of a coupling portion in which a feeding coil 30 is coupled to an antenna coil 20. FIG. 9A does not show the internal structure of the communication terminal 100.

The positional relationship between the antenna coil 20 and the feeding coil 30 differs from that in the antenna device according to the first preferred embodiment. In the third preferred embodiment, the antenna coil 20 and the feeding coil 30 integrated in the jacket (plate-shaped base member) 10 are arranged in the order of the antenna coil 20 and the feeding coil 30 from the outside when viewed from the communication terminal 100. In the case where they are arranged in this order, the distance between the housing of the communication terminal 100 and the antenna coil 20 is increased when the jacket 10 is attached to the communication terminal 100. Therefore, the electrical characteristics of the antenna coil 20 are also not easily changed by the type of the communication terminal 100 (in particular, the material of the housing) and the manner in which the communication terminal 100 is attached.

In the present preferred embodiment, the feeding coil 30 is mounted on one primary surface of the flexible base member 41 with a conductive bonding material, and the flexible base member 21 of the antenna coil is attached to the other principal surface of the flexible base member 41 with an adhesive AL. Since the jacket (plate-shaped base member) 10 is thin, there may be a case in which the degree of coupling becomes too high due to a small distance between the feeding coil 30 and the antenna coil 20. With the arrangement according to the present preferred embodiment, the distance between the feeding coil 30 and the antenna coil 20 is appropriately increased. Therefore, this arrangement is advantageous in the case where the degree of coupling between the feeding coil 30 and the antenna coil 20 is desirably relatively low. Since the antenna coil 20 is physically fixed to the flexible base member 41 preferably with an adhesive, the antenna coil 20 is indirectly fixed to the feeding coil 30, and the relative position between the feeding coil 30 and the antenna coil 20 does not easily change.

In the communication apparatus 203 according to the present preferred embodiment, the feeding coil 30 and the antenna coil 20 are arranged in that order when viewed from the communication terminal 100. When the contact surface between the communication terminal 100 and the antenna device 113, which is a jacket-shaped device, is made of a metal, in other words, when the antenna-device-113 side surface of the housing of the communication terminal 100 is made of a metal, the feeding coil 30 is positioned near the metal housing. Therefore, the magnetic flux easily passes through the feeding coil 30, whose winding axis extends parallel or substantially parallel to the surface of the metal housing, and the degree of coupling is increased.

Fourth Preferred Embodiment

FIG. 10A is a sectional view of a communication apparatus 204 in the state in which a communication terminal 100 is attached to a jacket 10 of an antenna device 114 according to a fourth preferred embodiment of the present invention. FIG. 10B is an enlarged partial sectional view of a coupling portion in which a feeding coil 30 is coupled to an antenna coil 20. FIG. 10A does not show the internal structure of the communication terminal 100.

The positional relationship between the antenna coil 20, the feeding coil 30, a wiring conductor 42, and an RW unit differs from that in the antenna device according to the first preferred embodiment. In the fourth preferred embodiment, the antenna coil 20 and the feeding coil 30 are integrated in the jacket (plate-shaped base member) 10 such that the antenna coil 20, a magnetic layer 70, and the feeding coil 30 are arranged in that order from the outside when viewed from the communication terminal 100. The wiring conductor 42 is located on a surface of a flexible base member 41 at a side opposite to the communication-terminal-100 side. Similarly, the feeding coil 30 and the RW unit 60 are also arranged on the surface at the side opposite to the communication-terminal-100 side.

Since the jacket (plate-shaped base member) 10 is thin, there may be a case in which the degree of coupling becomes too high due to a small distance between the feeding coil 30 and the antenna coil 20. The arrangement in which the magnetic layer 70 is disposed between the feeding coil 30 and the antenna coil 20 is advantageous in the case where the degree of coupling between the feeding coil 30 and the antenna coil 20 is desirably relatively low.

The magnetic layer 70 is disposed behind the antenna coil 20 when viewed from the antenna of the communication partner; thus, the antenna coil 20 is backed by the magnetic layer 70. Therefore, even when the degree of coupling between the feeding coil 30 and the antenna coil 20 is reduced, the magnetic flux generated by the antenna of the communication partner easily passes through the antenna coil 20.

To increase the degree of coupling between the feeding coil 30 and the antenna coil 20, the magnetic layer 70 may be removed only in an area in which the feeding coil 30 and the antenna coil 20 oppose each other. FIG. 10C is a plan view illustrating only the feeding coil 30, the magnetic layer 70, and the antenna coil 20 in that case. When the magnetic layer 70 is not provided in the area in which the feeding coil 30 and the antenna coil 20 oppose each other, the degree of coupling between the feeding coil 30 and the antenna coil 20 is increased.

As in the present preferred embodiment, the antenna coil 20 is preferably arranged so that it is exposed at a surface of the jacket 10. Even when the antenna coil 20 is exposed, since the antenna coil 20 is not directly connected to the feeding coil 30, low-frequency surge currents do not easily flow to the power-supplying portion.

Fifth Preferred Embodiment

Figure 11:
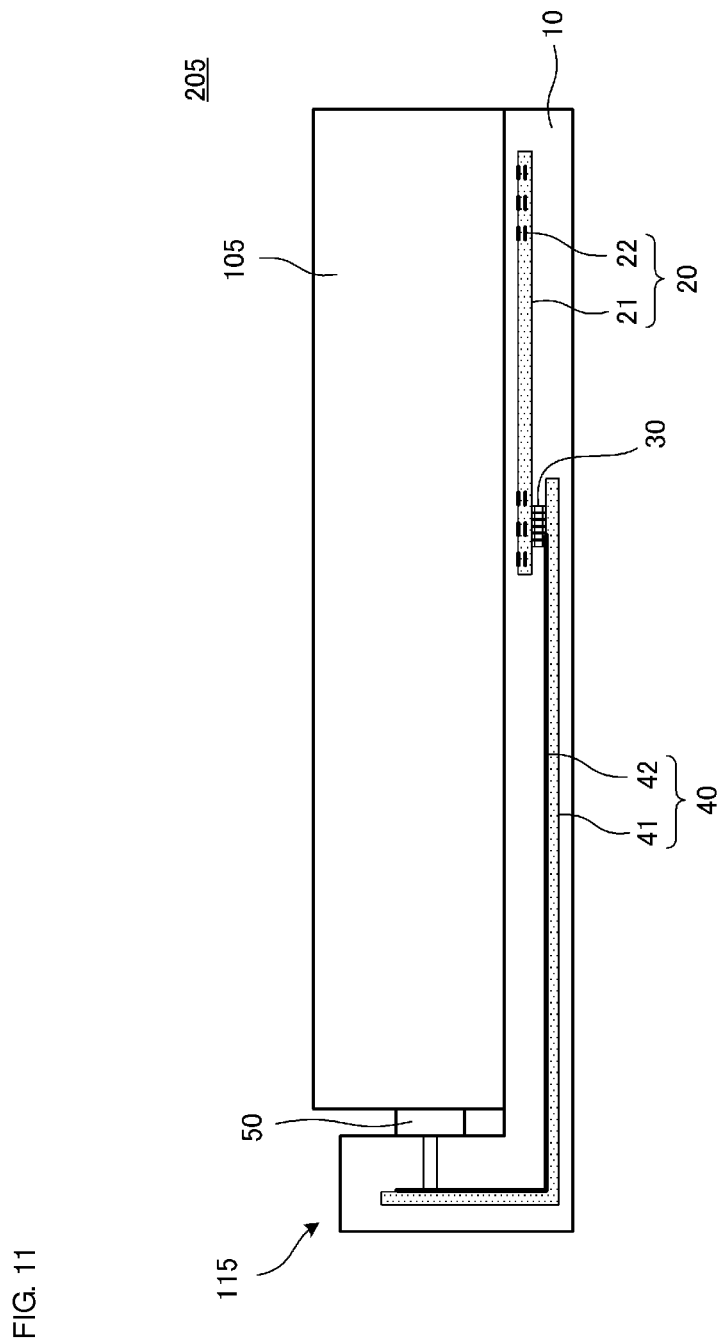
FIG. 11 is a sectional view of a communication apparatus 205 in the state in which a communication terminal 105 is attached to a jacket 10 of an antenna device 115 according to a fifth preferred embodiment of the present invention.

FIG. 11 is a sectional view of a communication apparatus 205 in the state in which a communication terminal 105 is attached to a jacket 10 of an antenna device 115 according to a fifth preferred embodiment of the present invention. FIG. 11 does not show the internal structure of the communication terminal 105.

Unlike the antenna device according to the first preferred embodiment, a feeding coil 30 is directly connected to a connector 50 by a wiring conductor 42 located on a flexible base member 41. In other words, no RW unit is provided on the jacket 10. A circuit corresponding to the RW unit is integrated in the communication terminal 105.

Thus, the structure of the antenna device is changed as appropriate in accordance with the structure of the communication terminal.

Sixth Preferred Embodiment

Figure 12:
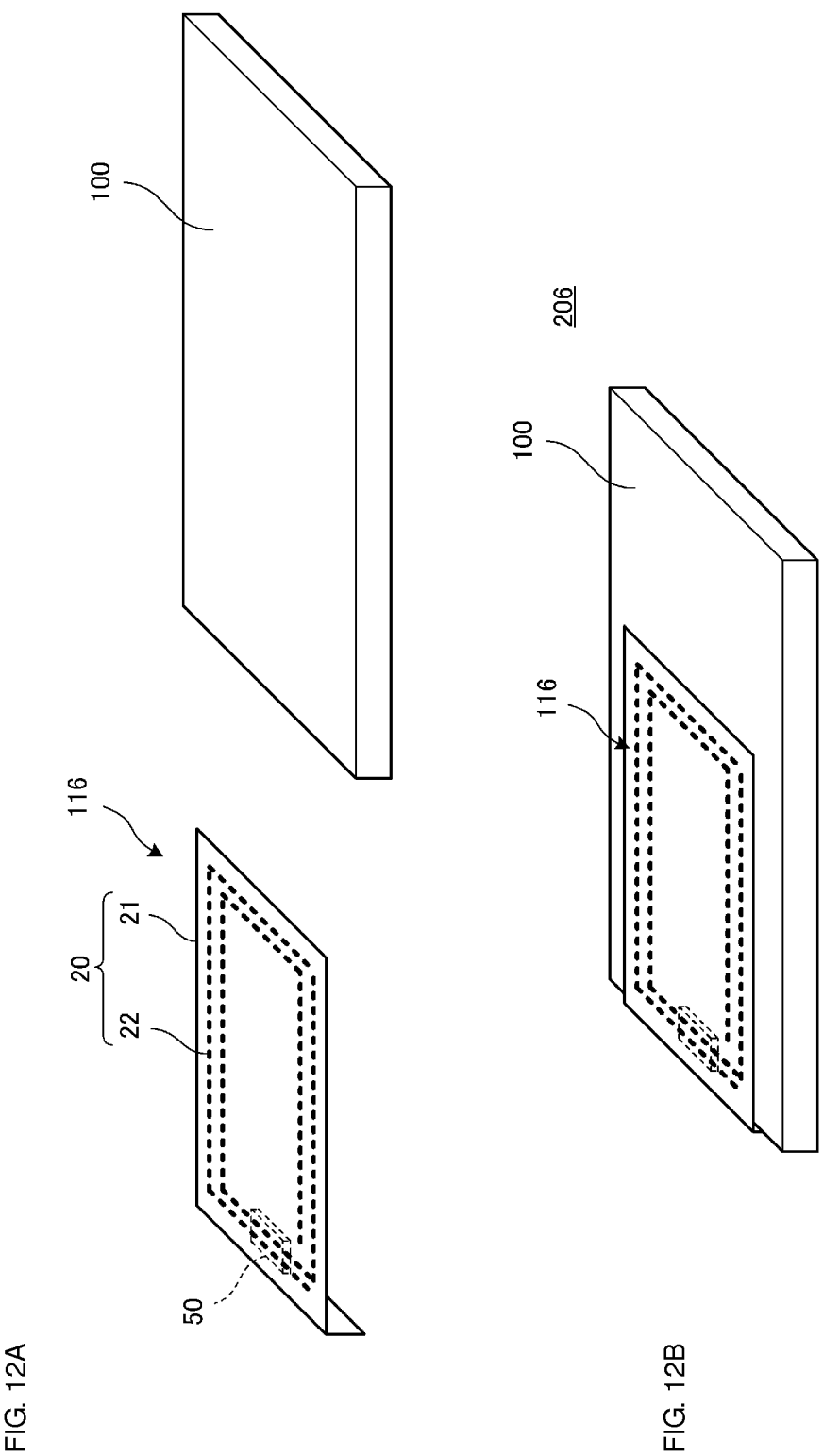
FIG. 12A is a perspective view illustrating the state in which an antenna device 116 according to a sixth preferred embodiment of the present invention is not yet attached to a communication terminal 100.
FIG. 12B is a perspective view of a communication apparatus 206 formed by attaching the antenna device 116 according to the sixth preferred embodiment of the present invention to the communication terminal 100.

FIG. 12A is a perspective view illustrating the state in which an antenna device 116 according to a sixth preferred embodiment of the present invention is not yet attached to a communication terminal 100. FIG. 12B is a perspective view of a communication apparatus 206 formed by attaching the antenna device 116 according to the sixth preferred embodiment to the communication terminal 100.

In each of the first to fifth preferred embodiments, the antenna device preferably is a jacket-shaped device including a thin plate-shaped base member as a principal surface portion and side wall portions that cover three side surfaces of the communication terminal, for example. In contrast, the antenna device 116 according to the sixth preferred embodiment preferably is a plate-shaped device having no side wall portions other than the side wall portion on which a connector 50 is formed. The antenna device 116 is smaller than the principal surface of the communication terminal 100. The antenna device 116 may be a back lid made of resin configured to put in and take out a battery pack. The antenna device 116 may instead be a resin housing of the communication terminal itself.

Seventh Preferred Embodiment

In a seventh preferred embodiment of the present invention, modifications of the shapes and arrangement of the antenna coil 20 and the feeding coil 30 will be described.

Figure 13:
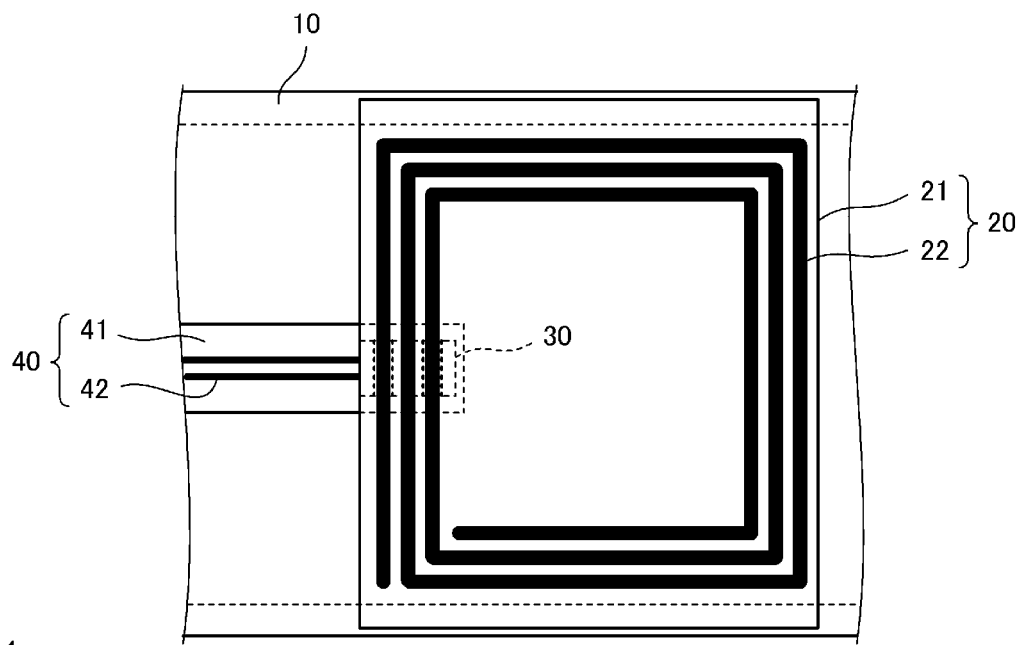
FIG. 13 is a plan view illustrating the shape of an antenna coil 20.

FIG. 13 is a plan view illustrating the shape of an antenna coil 20. The antenna coil 20 preferably includes a coil conductor 22 on a flexible base member 21. As illustrated in FIG. 13, the coil conductor 22 is preferably configured to extend along a single plane.

Figure 14:
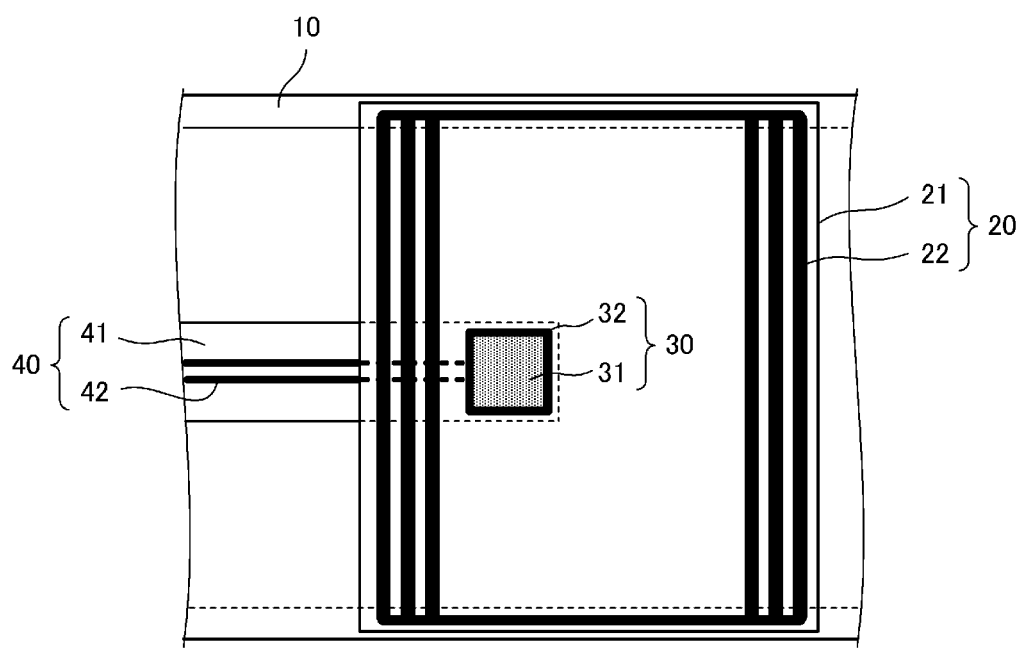
FIG. 14 is a plan view illustrating an example of an orientation of a winding axis of a feeding coil 30 with respect to an antenna coil 20.

FIG. 14 is a plan view illustrating an example of an orientation of a winding axis of a feeding coil 30 with respect to an antenna coil 20. In each of the first to sixth preferred embodiments, the feeding coil 30 preferably is arranged such that the winding axis of the coil thereof is perpendicular or substantially perpendicular to the winding axis of the coil conductor 22 of the antenna coil 20. However, as illustrated in FIG. 14, the feeding coil 30 may instead be arranged such that the winding axis of the coil conductor 32 of the feeding coil 30 is parallel or substantially parallel to the winding axis of the coil conductor 22 of the antenna coil 20.

Figure 15:
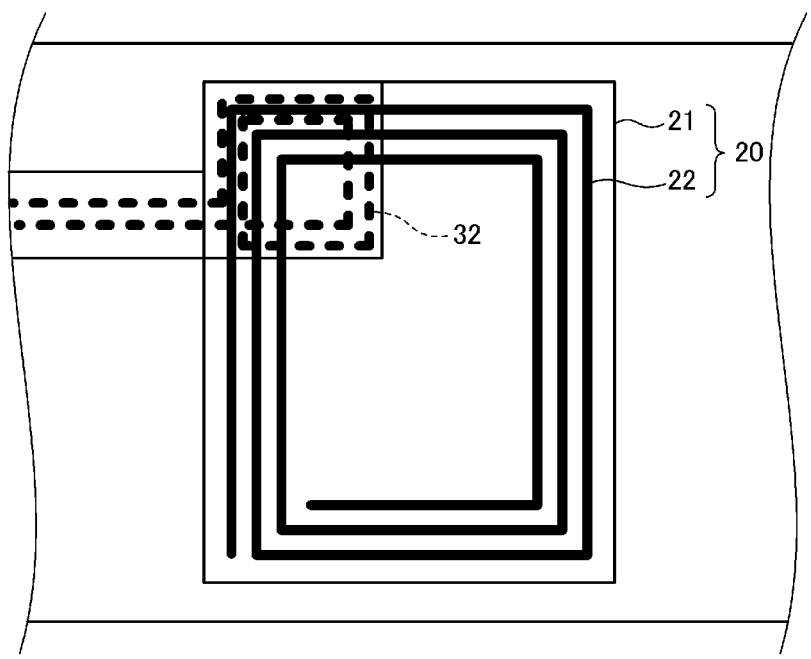
FIG. 15 is a plan view illustrating the positional relationship between a coil conductor 22 of an antenna coil and a coil conductor 32 of a feeding coil.

FIG. 15 is a plan view illustrating the positional relationship between a coil conductor 22 of an antenna coil and a coil conductor 32 of a feeding coil. As illustrated in FIG. 15, a corner of the coil conductor 32 of the feeding coil and a corner of the coil conductor 22 of the antenna coil are preferably arranged so as to coincide with each other, so that the coil conductor 32 of the feeding coil and the coil conductor 22 of the antenna coil are parallel or substantially parallel and close to each other over as long distance as possible. In this case, the degree of coupling between the feeding coil and the antenna coil is significantly increased.

Eighth Preferred Embodiment

In an eighth preferred embodiment of the present invention, modifications of the shapes and arrangement of the antenna coil 20 and the feeding coil 30 will be described.

Figure 16:
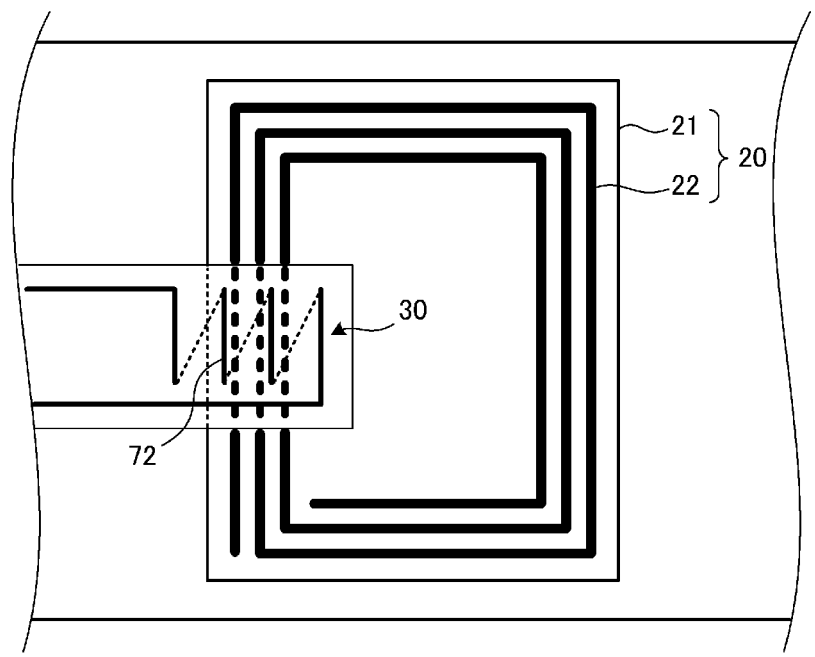
FIG. 16 is a plan view illustrating the shape of an antenna coil 20 according to an eighth preferred embodiment of the present invention.

FIG. 16 is a plan view illustrating the shape of an antenna coil 20. The antenna coil 20 preferably includes a coil conductor 22 located on a flexible base member 21. A feeding coil 30 includes a coil conductor 72 that extends along both sides of a flexible substrate. The coil conductor 72 is disposed in a central region of one side of the coil conductor 22 of the antenna coil 20. The coil conductor 72 includes a coil winding axis that extends toward a coil opening of the coil conductor 22 of the antenna coil 20. The coil conductor 72 of the feeding coil 30 is disposed so as to be parallel or substantially parallel to a portion of the coil conductor 22 of the antenna coil 20. Also in this structure, the coil conductor 22 and the feeding coil 30 preferably are magnetically coupled to each other.

In each of the above-described first to eighth preferred embodiments, the feeding coil 30 is directly bonded to the flexible base member 21 or the magnetic layer 70. However, the present invention is not limited to this. In other words, the feeding coil 30 may instead be spaced from the flexible base member 21 or the magnetic layer 70 by a certain distance.

In addition, although the wiring member 40 including the flexible base member 41 and the wiring conductor 42 is used as a member to connect the feeding coil 30 and the connector 50, the present invention is not limited to this. For example, the feeding coil 30 and the connector 50 may instead be connected with a wire disposed in the jacket 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a plate-shaped base member configured to be attached to a communication terminal or included in the communication terminal;
an antenna coil configured with the plate-shaped base member; and
a feeding coil that is magnetically coupled to the antenna coil, that is configured with the plate-shaped base member together with the antenna coil, and that is configured to receive and output a feeding signal; wherein
the antenna coil includes a first coil conductor having a first winding axis that extends in a direction perpendicular or substantially perpendicular to a principal surface of the plate-shaped base member;
the feeding coil is a chip component and includes a second coil conductor having a second winding axis that extends in a direction perpendicular or substantially perpendicular to the first winding axis;
the feeding coil further includes a first end face that is perpendicular to the second winding axis and a second end face that is opposed to the first end face;
the feeding coil and the antenna coil do not have a single current path;
a width of the feeding coil in a direction that is perpendicular to the second winding axis is smaller than a width of the antenna coil in a direction that is parallel or substantially parallel to the principal surface of the plate-shaped base member;
a portion of the second coil conductor overlaps with the first coil conductor in the direction perpendicular or substantially perpendicular to the principal surface of the plate-shaped base member; and
a minimum distance between the first end face and a center of the antenna coil is shorter than a minimum distance between the second end face and the center of the antenna coil.

2. The antenna device according to claim 1, wherein
the antenna coil includes a first base member and the first coil conductor is located on the first base member;
the antenna device further comprises a wiring member including a second base member and a wiring conductor located on the second base member and connected to the feeding coil.

3. The antenna device according to claim 2, wherein the plate-shaped base member is configured to be attached to the communication terminal and includes a connector to which the communication terminal is to be connected, and the feeding coil and the connector are connected to each other with the wiring conductor of the wiring member directly or via another circuit.

4. The antenna device according to claim 3, wherein an RFIC element is mounted on the second base member, the RFIC element being connected between the feeding coil and the connector and being configured as a chip component.

5. The antenna device according to claim 1, wherein the plate-shaped base member is configured to be attached to the communication terminal, and a magnetic layer is provided between the communication terminal and the antenna coil.

6. The antenna device according to claim 1, wherein the plate-shaped base member is configured to be attached to the communication terminal, and the feeding coil and the antenna coil are integrated in the plate-shaped base member so that the antenna coil and the feeding coil are arranged in that order when viewed from the communication terminal.

7. The antenna device according to claim 2, wherein the feeding coil, the antenna coil, and the wiring member are integrated together.

8. The antenna device according to claim 1, wherein
the plate-shaped base member is configured to be attached to the communication terminal; and
the plate-shaped base member is a jacket having an external shape that extends at least along one principal surface of the communication terminal and one of side surfaces of the communication terminal.

9. A communication apparatus comprising:
an antenna device; and
a communication terminal; wherein
the antenna device includes:
a plate-shaped base member;
an antenna coil configured with the plate-shaped base member; and
a feeding coil that is magnetically coupled to the antenna coil, that is configured with the plate-shaped base member together with the antenna coil, and that is configured to receive and output a feeding signal;
the antenna coil includes a first coil conductor having a first winding axis that extends in a direction perpendicular or substantially perpendicular to a principal surface of the plate-shaped base member;

the feeding coil is a chip component and includes a second coil conductor having a second winding axis that extends in a direction perpendicular or substantially perpendicular to the first winding axis;

the feeding coil further includes a first end face that is perpendicular to the second winding axis and a second end face that is opposed to the first end face;

the feeding coil and the antenna coil do not have a single current path;

a width of the feeding coil in a direction that is perpendicular to the second winding axis is smaller than a width of the antenna coil in a direction that is parallel or substantially parallel to the principal surface of the plate-shaped base member;

a portion of the second coil conductor overlaps with the first coil conductor in the direction perpendicular or substantially perpendicular to the principal surface of the plate-shaped base member;

a minimum distance between the first end face and a center of the antenna coil is shorter than a minimum distance between the second end face and the center of the antenna coil; and the plate-shaped base member is configured to be attached to the communication terminal.

10. The communication apparatus according to claim 9, wherein the antenna coil includes a first base member and the first coil conductor is located on the first base member;

the antenna device further comprises a wiring member including a second base member and a wiring conductor located on the second base member and connected to the feeding coil.

11. The communication apparatus according to claim 10, wherein the plate-shaped base member is configured to be attached to the communication terminal and includes a connector to which the communication terminal is to be connected, and the feeding coil and the connector are connected to each other with the wiring conductor of the wiring member directly or via another circuit.

12. The communication apparatus according to claim 11, wherein an RFIC element is mounted on the second base member, the RFIC element being connected between the feeding coil and the connector and being configured as a chip component.

13. The communication apparatus according to claim 9, wherein the plate-shaped base member is configured to be attached to the communication terminal, and a magnetic layer is provided between the communication terminal and the antenna coil.

14. The communication apparatus according to claim 9, wherein the plate-shaped base member is configured to be attached to the communication terminal, and the feeding coil and the antenna coil are integrated in the plate-shaped base member so that the antenna coil and the feeding coil are arranged in that order when viewed from the communication terminal.

15. The communication apparatus according to claim 10, wherein the feeding coil, the antenna coil, and the wiring member are integrated together.

16. The communication apparatus according to claim 9, wherein the plate-shaped base member is configured to be attached to the communication terminal; and the plate-shaped base member is a jacket having an external shape that extends at least along one principal surface of the communication terminal and one of side surfaces of the communication terminal.

* * * * *